US012724632B2

(12) United States Patent
Durazzo et al.

(10) Patent No.: US 12,724,632 B2
(45) Date of Patent: Sep. 1, 2026

(54) QUEUE CONSOLIDATION AND PEER-TO-PEER QUANTUM WORKLOAD STEALING

(71) Applicant: Dell Products L.P., Round Rock, TX (US)

(72) Inventors: Kenneth Durazzo, Morgan Hill, CA (US); Stephen J. Todd, North Andover, MA (US); Michael N. Robillard, Shrewsbury, MA (US); Victor Fong, Melrose, MA (US); Eric J. Bruno, Shirley, NY (US); Amy N. Seibel, Newton, MA (US); Benjamin E. Santaus, Somerville, MA (US); Brendan Burns Healy, Whitefish Bay, WI (US)

(73) Assignee: Dell Products L.P., Round Rock, TX (US)

( * ) Notice: Subject to any disclaimer, the term of this patent is extended or adjusted under 35 U.S.C. 154(b) by 706 days.

(21) Appl. No.: 17/811,354

(22) Filed: Jul. 8, 2022

(65) Prior Publication Data

US 2024/0012678 A1 Jan. 11, 2024

(51) Int. Cl.
*G06F 9/48* (2006.01)
*G06N 10/80* (2022.01)

(52) U.S. Cl.
CPC ........... *G06F 9/4881* (2013.01); *G06N 10/80* (2022.01)

(58) Field of Classification Search
CPC .............................. G06F 9/4881; G06N 10/80
See application file for complete search history.

(56) References Cited

U.S. PATENT DOCUMENTS 4,914,570 A 4/1990 Peacock
6,714,960 B1 3/2004 Bitar et al.
10,817,337 B1 10/2020 Richardson et al.
11,170,137 B1 11/2021 Richardson et al.
11,270,220 B1 3/2022 Richardson et al.
11,663,051 B2 5/2023 Vasileiadis et al.
12,032,888 B2 7/2024 Doi
2009/0070550 A1 3/2009 Solomon
2011/0161965 A1 6/2011 Im et al.
2011/0307437 A1 12/2011 Aliferis et al.
2016/0357676 A1 12/2016 Cain et al.
2018/0308000 A1 10/2018 Dukatz et al.
2018/0375784 A1 12/2018 Balakrishnan et al.
2019/0213509 A1 7/2019 Burleson et al.
2019/0243682 A1* 8/2019 Botelho ................. G06F 21/44 718/100
2020/0201655 A1* 6/2020 Griffin ................. G06F 9/4494 706/62
2021/0073028 A1 3/2021 Li et al.
2021/0158425 A1 5/2021 Kasprowicz et al.
2021/0294644 A1 9/2021 Nott
2021/0357278 A1 11/2021 Lee et al.
2022/0383171 A1 12/2022 Griffin et al.
2022/0398129 A1 12/2022 Bishop et al.

(Continued)

*Primary Examiner* — Aimee Li
*Assistant Examiner* — Harrison Li
(74) *Attorney, Agent, or Firm* — Workman Nydegger

(57) ABSTRACT

Distributing quantum jobs are disclosed. When a quantum processing unit is underutilized or when wait times are long, quantum jobs may be distributed from the job queue of one vendor to another vendor. This improves utilization and reduces wait times.

20 Claims, 7 Drawing Sheets

(56) References Cited

U.S. PATENT DOCUMENTS

| | | | | |
|---|---|---|---|---|
| 2022/0414509 | A1 | 12/2022 | Haah | |
| 2023/0066093 | A1 | 3/2023 | Coady et al. | |
| 2023/0110628 | A1* | 4/2023 | Heckey | G06F 9/4881 718/103 |
| 2023/0140809 | A1 | 5/2023 | Palop et al. | |
| 2023/0315539 | A1* | 10/2023 | Scheps | G06N 10/60 718/102 |
| 2023/0342652 | A1* | 10/2023 | Haverkamp | G06N 10/80 706/62 |
| 2024/0378085 | A1 | 11/2024 | Ravi et al. | |
| 2024/0394414 | A1 | 11/2024 | Radha et al. | |

* cited by examiner

QUEUE CONSOLIDATION AND PEER-TO-PEER QUANTUM WORKLOAD STEALING

FIELD OF THE INVENTION

Embodiments of the present invention generally relate to quantum processing and to quantum workload distribution. More particularly, at least some embodiments of the invention relate to systems, hardware, software, computer-readable media, and methods for consolidating quantum workloads with independent and/or unrelated quantum processing units.

BACKGROUND

Quantum computing is a type of computing that uses quantum states. A quantum system, which may include a quantum processing unit and other components such as electronic control components, is configured to execute quantum circuits. The quantum circuits may use various aspects of quantum states, such as superposition, interference, and entanglement. When quantum circuits are executed, they are executed iteratively or repeatedly. Each execution is referred to as a shot.

The output of a quantum processing unit is a distribution of the shots. If a quantum processing unit has n qubits, the output is commonly a bitstring distribution, where the bitstring has a length of n.

Quantum vendors provide quantum processing units to users and users may submit their quantum jobs to a specific quantum vendor. Each vendor typically provides a job queue. For example, two vendors may provide similar quantum computation capabilities. However, the quantum processing unit of the first vendor may be starved for workloads, while the quantum processing unit of the second vendor may have ample workloads. The downside for the second vendor is that users may experience long wait times due to the number of workloads in the job queue. This isolation can result in low utilization for vendors and high wait times for users.

Because the vendors are unrelated, a global control plane is very challenging. This may be due to the fact that vendors operate as silos and because some vendors may have different types of agreements. The arrangement is further complicated by the fact that the quantum computational capabilities and pricing may be different across the quantum vendors and by the fact that vendors may not have sufficient financial incentive to share workloads (and thus business) without other vendors, even if in the best interest of the customer.

Global optimization across all vendors is complicated and subject to many different factors to be solved in real time. The ability to optimally place a workload is NP-hard.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate quantum processing and quantum computing. More particularly, at least some embodiments of the invention relate to systems, hardware, software, computer-readable media, and methods for distributing or redistributing quantum jobs in or from job queues across multiple quantum processing units.

In general, example embodiments of the invention relate to a mechanism that allows quantum computing systems to evaluate quantum jobs in the job queues of other quantum computing systems (which may be associated with different vendors) and pull quantum jobs from the queues of other quantum computing systems. In particular, example embodiments of the invention allow quantum computing systems to pull or retrieve quantum jobs from other quantum computing systems when quantum computing systems are under-utilized. From a holistic viewpoint, this advantageously improves the usage of the quantum computing systems and reduces user wait times.

Example embodiments allow multiple quantum computing systems to communicate using a peer-to-peer (P2P) mechanism. In effect, this reduces the challenge of a many-to-many optimization to a one-to-many optimization. More specifically, a global control plane configured to control multiple independent quantum computing systems is often hampered by various agreements that may exist with respect to some of the vendors. Embodiments of the invention allow complex agreement negotiations to be avoided using a P2P mechanism.

Figure 1:
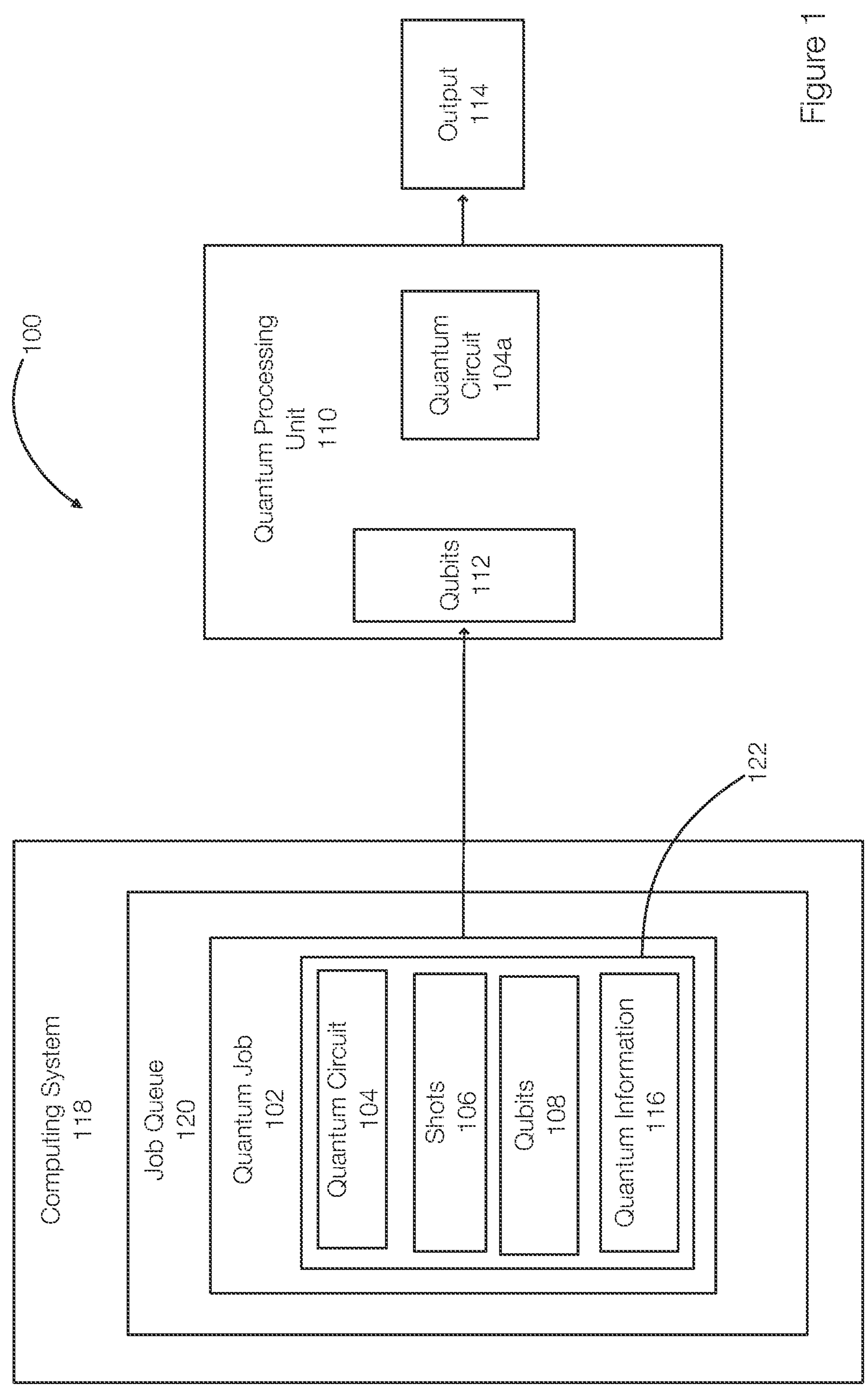
FIG. 1 discloses aspects of a quantum processing unit and a job queue for holding quantum jobs.

FIG. 1 discloses aspects of performing a quantum job in a quantum computing system. FIG. 1 illustrates a quantum computing system 100 that primarily includes a quantum processing unit 110. The quantum computing system 100 may also include a computing system 118 (processors, memory, network hardware, etc.). The computing system 118 may feed or input a quantum job to the quantum processing unit 110 and may also be an interface between the quantum processing unit 110 and other remote compute/quantum computing systems. In addition, the computing system 118 may be remote from the quantum processing unit 110.

The quantum processing unit 110 is typically associated with qubits 112. The number of qubits 112 is typically fixed. The quantum processing unit 110 may handle any quantum circuit that is configured for a number of qubits equal to or less than the number of qubits 112. In some instances, some of the qubits 112 of the quantum processing unit may go unused when the quantum job 102 required less than all of the qubits 112 of the quantum processing unit 110.

In one example, the quantum processing unit 110 should also be able to run the quantum circuit. There needs to be both enough qubits and a valid mapping between the input quantum circuit and the physical circuit actually executed. More specifically, preparing to execute a quantum circuit includes transpiling the input quantum circuit. This is the process of rewriting or matching an input quantum circuit to the topology of a specific quantum system. This may also optimize the quantum circuit to account for noise. If the input circuit cannot be matched (e.g., due to high entanglement), the physical quantum system may not be able to run the circuit.

The computing system 118 may maintain or have access to a quantum job queue 120 (job queue 120) of the quantum processing unit 110. The quantum processing unit 110 pulls jobs from the job queue 120. The job queue 120 includes a quantum job 102, which is representative of any number of quantum jobs. The quantum job 102 is associated with or includes a quantum package 122, which may include, by way of example, a quantum circuit 104, shots 106, qubits 108, and other quantum information 116 including time constraints.

The quantum circuit 104 may define how qubits are initialized, number of qubits, a sequence of quantum operations, quantum measurements, and the like. The quantum circuit 104 may or may not entangle at least some of the qubits. The shots 106 is the number of times that the quantum circuit 104 is to be executed by the quantum processing unit 110. The qubits 108 is the number of qubits required or specified for the quantum job 102. The quantum information 116 may include quantum processing unit model expected by the user, pricing, budget, or the like.

When the quantum processing unit 110 is ready to perform the next quantum job, the quantum job 102 is retrieved from the job queue 120. The quantum processing unit 110 is initialized with the quantum circuit 104 (represented as quantum circuit 104*a*). Once the quantum circuit 104*a* is prepared and initialized in the quantum processing unit 110, the specified number of shots 106 of the quantum circuit 104*a* are performed iteratively.

Each shot generates an output 114. More specifically, each shot results in a bitstring whose length is equal to the number of qubits 108. The output 114 commonly includes a distribution of bitstrings.

Figure 2A:
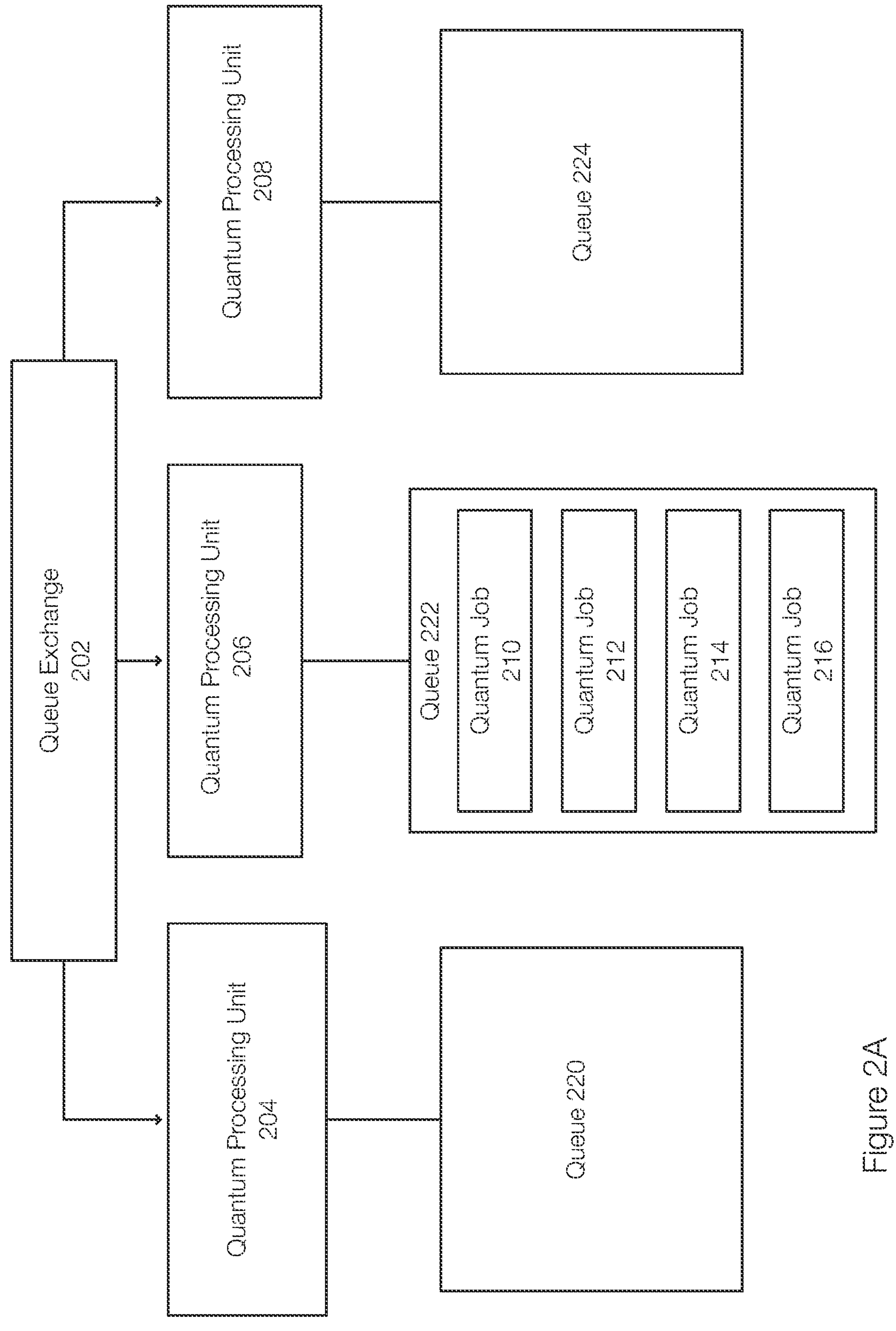
FIG. 2A discloses aspects of a queue exchange for distributing or redistributing quantum jobs amongst quantum processing units.
Figure 2B:
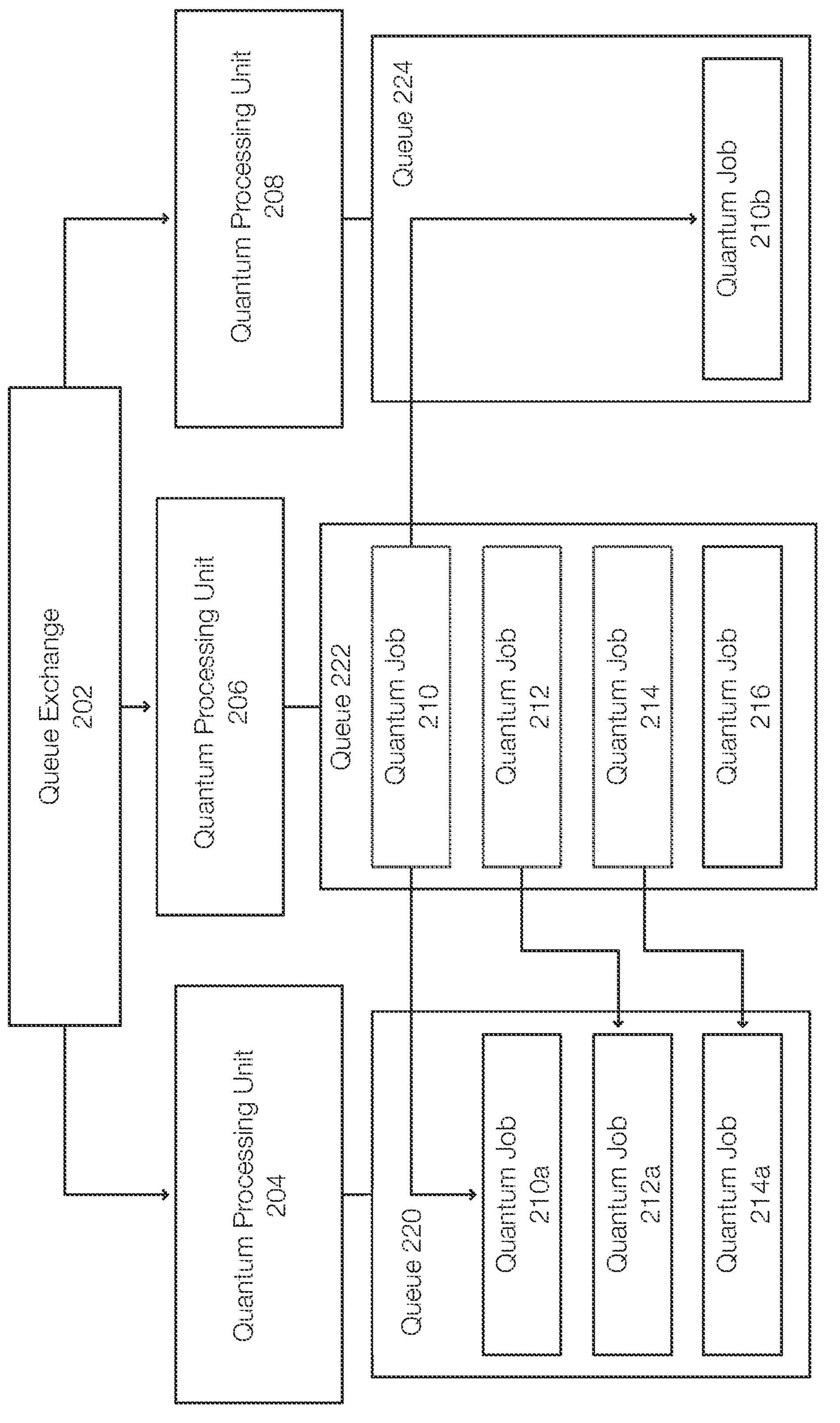
FIG. 2B discloses additional aspects of distributing quantum jobs to different job queues using a queue exchange.

FIG. 2A discloses aspects of distributing (or redistributing) quantum jobs. FIG. 2B illustrates aspects of (re)distributing quantum jobs. FIG. 2A, more specifically, illustrates the states of multiple quantum processing systems (or units) prior to the redistribution of quantum jobs. More specifically, FIG. 2A illustrates the contents of job queues of various quantum processing units prior to some of those quantum jobs being redistributed.

FIG. 2B illustrates the contents of the job queues of the same quantum processing units after the quantum processing jobs have been redistributed. In one example, redistribution includes a quantum processing unit pulling or retrieving a quantum job from the job queue of a different quantum processing unit.

Embodiments of the invention allow quantum jobs to be distributed from one quantum processing unit to another quantum processing unit, which may be associated with different vendors.

FIG. 2A illustrates quantum processing units 204, 206, and 208, each of which is associated with a different vendor. Initially, as illustrated in FIG. 2A, the queue 220 of the quantum process unit 204 is empty, the queue 224 of the quantum processing unit 208 is empty, and the queue 222 of the quantum processing unit 206 includes quantum jobs 210, 212, 214, and 216. In this example, the quantum processing units 204 and 208 are starved or underutilized, and users associated with the quantum jobs 210, 212, 214 and 216 may experience longer wait times before their quantum jobs are executed by the quantum processing unit 206.

In addition, the quantum processing unit 206 (or the vendor) may not be motivated to share the quantum jobs 210, 212, 214, and 216 with the quantum processing units 204 and 208, which are associated with unrelated vendors in one example. In some embodiments, the queue exchange 202 may also facilitate a process to associate a price with a quantum job and set an amount that the referring vendor would receive. For example, the information exchanged via the queue exchange 202 may include price information. A user may expect to pay a certain price for the quantum job 212. If the quantum processing unit 206 allows the queue 220 to retrieve and perform the quantum job 212, the vendor may receive a portion of the price paid by the user. This allows the vendor of the quantum processing unit 204 to be paid for performing the quantum job 212 and allows the vendor of the quantum processing unit 206 to receive a fee or commission for allowing the quantum job to be removed from the queue 222 and placed in the queue 220. Distributing quantum jobs as disclosed herein addresses these issues.

As illustrated in FIGS. 2A and 2B, the quantum processing units 204, 206, and 208 include, respectively, a job queue 220, a job queue 222, and a job queue 224. In this example, the quantum processing units 204, 206, and 208 may communicate using a queue exchange 202. The queue exchange 202 may include a publication mechanism or a retrieval mechanism.

In one example, the quantum processing unit 206 may publish the description (e.g., description 122) of each of the quantum jobs 210, 212, 214, and 216 to the other quantum processing units 204 and 208. Alternatively, the quantum processing unit 204 may be associated with an API (Application Programming Interface) that allows the quantum processing units 206 and 208 to retrieve the descriptions or packages of the quantum jobs in the job queue 204. The descriptions of quantum jobs in other job queues can be similarly obtained. The description 122 published for the quantum jobs 210, 212, 214, and 216 may also include financial terms, such as how the fee is split as previously discussed.

By way of example, the queue exchange 202 is a P2P (peer-to-peer) mechanism that allows quantum processing units (or systems) to share information/descriptions of the quantum jobs in their respective job queues. When the queue exchange 202 is a P2P mechanism, price information or financial terms may also be included in the information/descriptions of the quantum jobs.

In FIG. 2B, the quantum jobs 210, 212, 214, and 216, which were originally submitted to and included in the job queue 222 as illustrated in FIG. 2A, have been distributed. The quantum jobs 210, 212, and 214 are illustrated in dashed lines to illustrate that they have been moved or distributed to other quantum processing systems or units. The quantum job 216 remains in the queue 222.

Thus, the quantum jobs 210*a*, 212*a*, and 214*a* represent that the quantum jobs 210 (or portion thereof), 212, and 214 have been distributed to the quantum processing unit 204. Another portion of the quantum job 210 has been distributed to the queue 224 of the quantum processing unit 208 and is represented as the quantum job 210*b*.

Figure 3A:
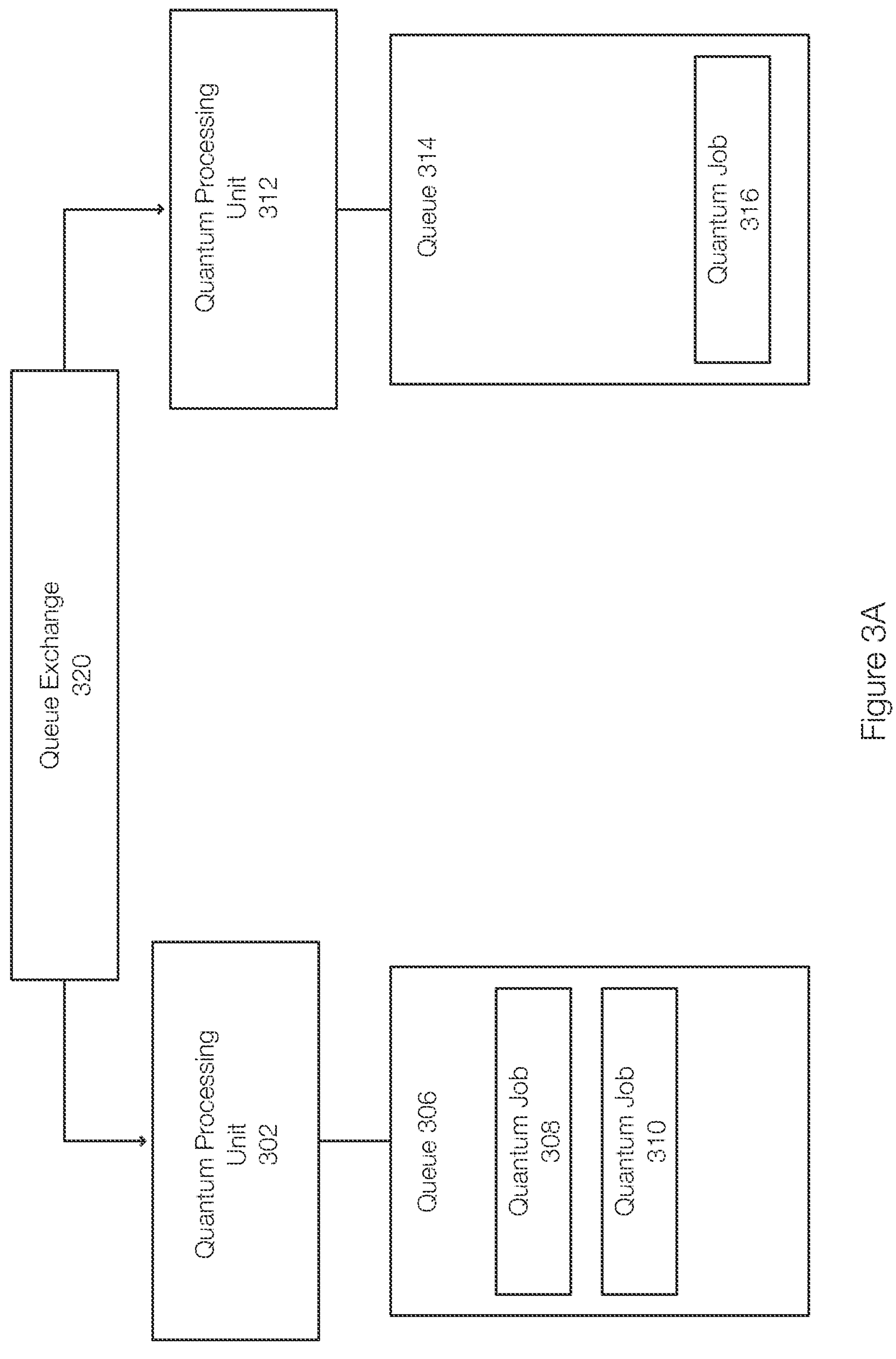
FIG. 3A discloses aspects of distributed quantum jobs.
Figure 3B:
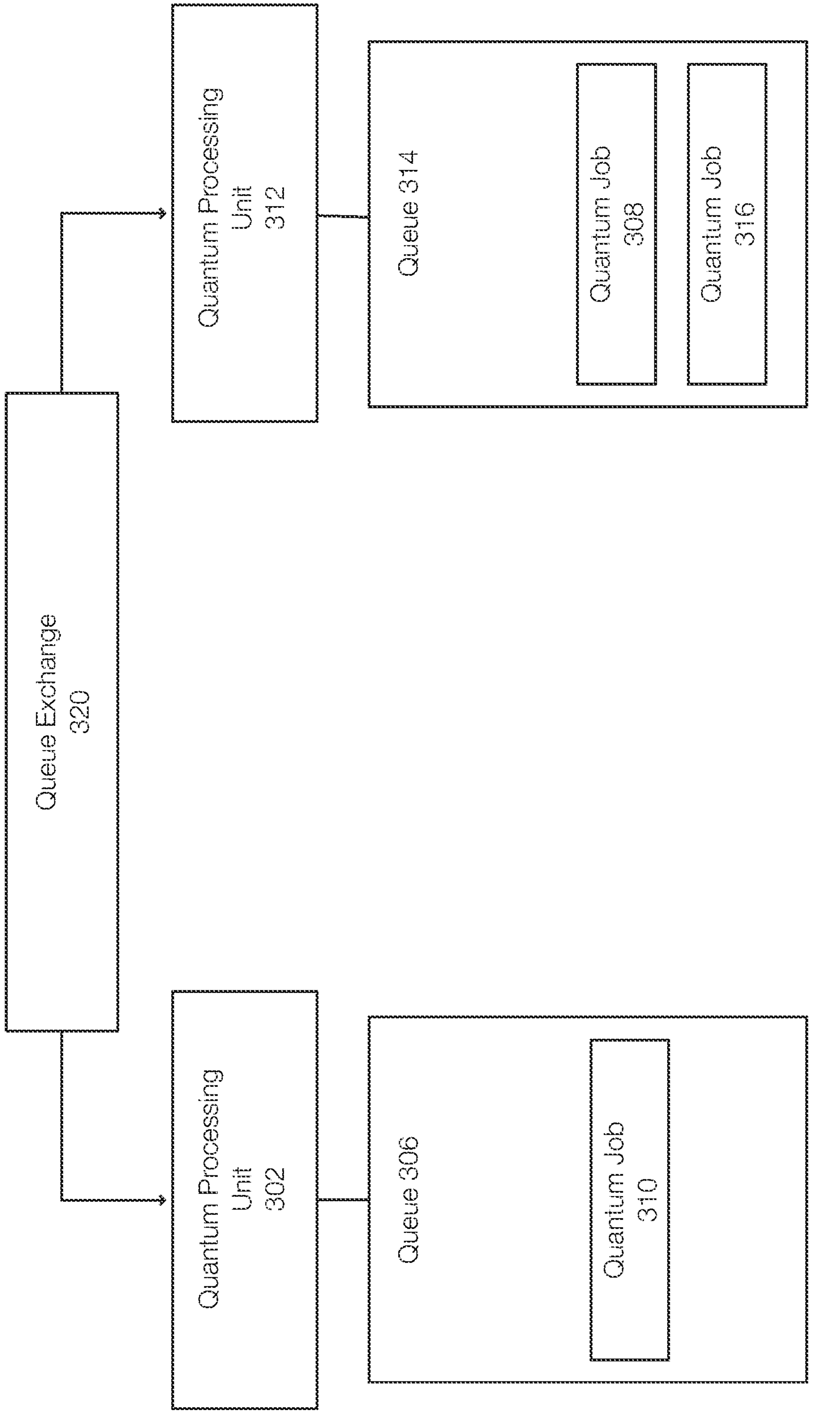
FIG. 3B discloses aspects of distributed quantum jobs.
Figure 4:
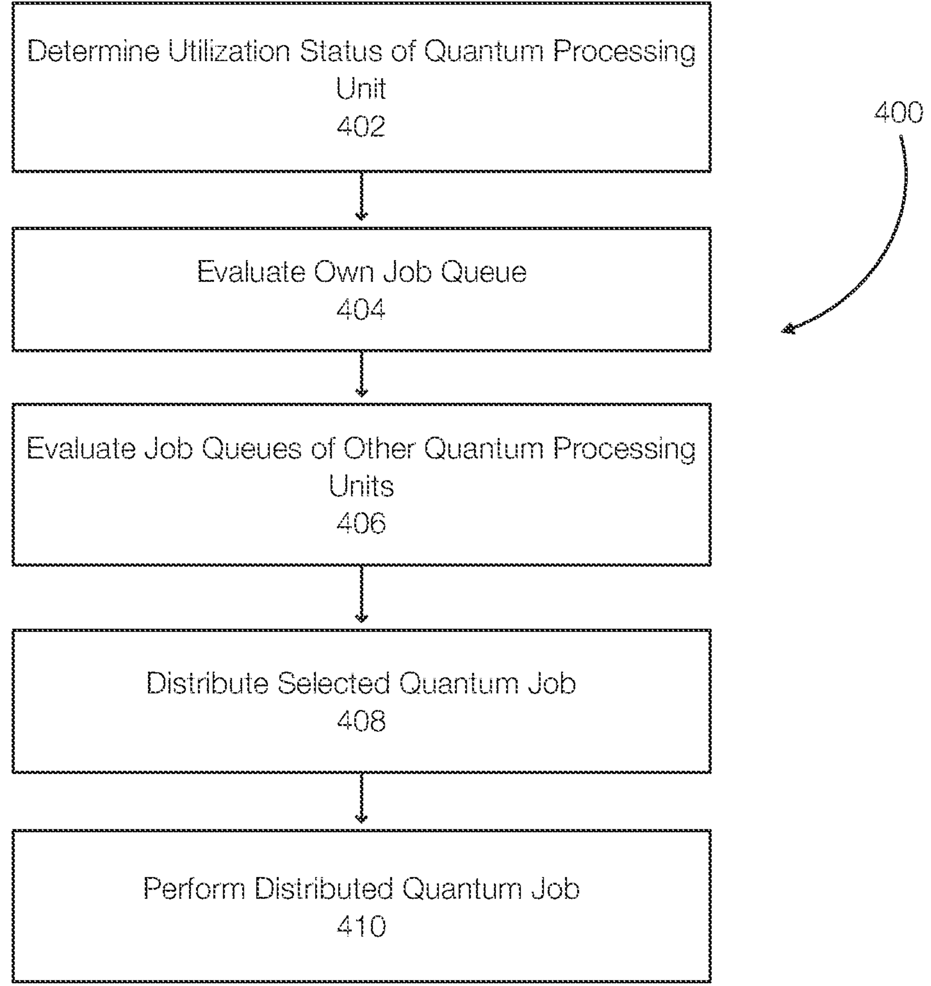
FIG. 4 discloses aspects of distributing quantum jobs among multiple quantum processing units.

FIG. 3A discloses aspects of redistributing a quantum job from one quantum processing unit to another quantum processing unit prior to distribution of a quantum job. FIG. 3B illustrates the quantum processing units and associated job queues after distribution. FIG. 4 discloses aspects of distributing a quantum job. The method 400 is discussed with respect to the quantum processing units 302 and 312 in FIGS. 3A and 3B.

Prior to quantum job distribution, the quantum processing unit 302 has quantum jobs 308 and 310 in its queue 306. The quantum processing unit 312 includes a quantum job 316 in its queue 314.

The method 400 may begin when the quantum processing unit 312 determines 402 its utilization status. The status may be underutilized and may be measured by a ratio such use/hour. The queue may be underutilized when use drops below a threshold.

In this example, the quantum processing unit 312 (or the classical computing portion of the quantum computer) determines that a quantum job 316 is present and ready for execution. The quantum processing unit 312 may begin preparing the quantum job 316 for execution.

The quantum processing unit 312 determines that the quantum job 316 uses n qubits and that x qubits are available. In response, the queue 314 is evaluated. In this example, which is prior to distribution, the queue 314 does not contain any other quantum jobs. Alternatively, it may be that the quantum jobs in the queue 314 cannot be executed at the same time as the quantum job 316.

Thus, the quantum processing unit 312, using the queue exchange 320, evaluates the quantum jobs in the queue 306 of the quantum processing unit 302: quantum jobs 308 and 310. Using the description (e.g., description 122), the quantum processing unit 312 may determine that the quantum job 308 can be executed at the same time as the quantum job 316 on the quantum processing unit 312.

In other words, if the quantum processing unit 312 cannot find a quantum job that can use the qubits not used by the quantum job 316 in its own queue 314, the quantum processing unit 312 may look for suitable quantum jobs in the job queues of other quantum processing units.

Evaluating 406 the job queues of other quantum processing units may include evaluating the descriptions or metadata of the quantum jobs. Thus, the quantum processing unit 312 (or classical computing portion) may evaluate the metadata or packages of the quantum jobs 310 and 308. Because the descriptions or metadata may include financial information (e.g., fee splitting information), the evaluation 406 may include a cost analysis to determine whether a particular job is financially viable. The evaluation 406 may include using a log or other mechanism to record financial aspects of quantum job distribution such that payments to the relevant vendors can be made. For example, a user may make payment to the originally selected quantum vendor. If that vendor allows a quantum job to be removed and performed by another quantum vendor, the transaction may be logged such that both vendors receive payment in accordance with the terms associated with the quantum job. In one example, this type of fee or financial arrangements may be approved by the user submitting the quantum job in advance. This allows a quantum vendor to retrieve and perform quantum jobs that are financially beneficial.

In this example, the quantum job 310 is eliminated as a candidate because there are not enough qubits on the quantum processing unit 312 to accommodate both the quantum job 316 and the quantum job 310. The evaluation of the quantum job 308 determines that the quantum job 308 requires m qubits and that $m<x$ (m is less than the available qubits x at the quantum processing unit 312). Thus, the quantum processing unit 312 can execute both the quantum job 308 and the quantum job 316 because the qubits $(n+m)$ $\le$the total qubits of the quantum processing unit 312.

This is possible because, unless qubits are entangled, each qubit of the quantum jobs 308 and 316 can be executed independent of the other qubits in the quantum jobs 308 and 316. Thus, the block of qubits used by the circuit 316 can be independent of the block of qubits used by the circuit 308. In one example, the quantum processing unit 312 may include qubit partitions to avoid noise. Further, when qubits are not entangled, the order of execution of the gates can be rearranged.

Next, due to the time required to set up a quantum circuit, the number of shots will be the same for all quantum jobs being performed at the same time. As a result, the package of the job 308 may specify 512 shots. If the package of the job 316 specifies 1024 shots, then 1024 shots will be performed for both of the quantum jobs 308 and 316. Embodiments may perform the highest number of shots between the quantum jobs being performed.

This example also assumes that an owner has given permission for these types of quantum job changes (distribution to another quantum processing unit, which may be of a different type, have different confidence and/or accuracy, changing number of shots, running concurrently with another quantum job on the same quantum processing unit, or the like).

Once this evaluation is processed, the quantum job 308 is distributed 408 or moved from the queue 306 to the job queue 314, as illustrated in FIG. 3B. The quantum jobs 308 and 316 are then performed 410 concurrently on the quantum processing unit 312.

Alternatively, the queue 306 may include multiple quantum jobs such that some of the users may experience a longer wait. In this case, the quantum processing unit 312 may still retrieve a quantum job from the queue 306 into the queue 314 even if not being executed concurrently with the quantum job 316. This allows the usage of the quantum processing unit 312 to improve while reducing wait times at the quantum processing unit 302.

In some instances, a quantum job may be divided. As illustrated in FIG. 2B, a portion (210*a*) of the quantum job 210 was distributed to the quantum processing unit 204 and another portion (210*b*) was distributed to the quantum processing unit 208. This allows the quantum processing units to coordinate to split a quantum job to reduce overall wait times. For example, a quantum job may be split to two different quantum processing units such that the quantum job can be performed more quickly when necessary or for other reasons. This prevents the user from waiting for the first portion to execute and then waiting for the second portion to execute.

When splitting the quantum circuit of a quantum job and distributing the portions to different quantum processing units, the portion 210*a* includes qubits that are not entangled with any of the qubits sent to the portion 210*b*.

When evaluating the job queue of another quantum processing unit, the quantum job can be selected using optimization algorithms, such as greedy searches or heuristic searches, in order to identify the quantum job that is of the highest value to the searching quantum processing unit. For example, these optimizations may be used to identify the quantum jobs that have the highest revenue within the context of restraints such as, by way of example, available qubits, entanglement, wait times, and lowest cost to customer. Additional restraints or considerations may include preferences that may focus on customer satisfaction, such as geographic location and security. Revenue associated with the quantum jobs may be split based on any previously arranged agreements. For example, some users may value speed more than cost/price or vice versa. Other users may value meeting all requirements, customer satisfaction, or the like.

Although FIG. 4 is discussed by way of example in the context of quantum processing units that are underutilized and that are seeking to improve their utilization, embodiments of the invention may similarly apply to quantum processing units that have long wait times. QPUs with long wait times may proactively seek a partner, using a queue exchange, to perform quantum jobs. Thus, the distribution or redistribution process may be initiated by the sender QPU of the quantum job or by the recipient of the quantum job.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, quantum computing operations, job queue operations (e.g., inserting, retrieving, ordering quantum jobs with respect to multiple job queues and multiple vendors), quantum processing optimization operations, or the like.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment. Qiskit Dell Runtime is an example platform in which quantum operations disclosed herein may be performed.

In addition to the cloud environment, the operating environment may also include one or more clients that are capable of collecting, modifying, and creating, data such as quantum jobs. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: determining a utilization status of a first quantum processing unit when preparing to execute a quantum circuit included in a first quantum job retrieved from a first job queue associated with the first quantum processing unit, evaluating a second job queue of a second quantum processing unit to determine if the job queue contains a second quantum job that can be executed concurrently with or separately from the first quantum job, retrieving at least a portion of the second quantum job from the second job queue into the first job queue, and performing the first quantum job and at least the portion of the second quantum job concurrently or separately in the first quantum processing unit.

Embodiment 2. The method of embodiment 1, further comprising evaluating a number of qubits required by the second quantum job and determining whether total qubits used by the first quantum job and the second quantum job are less than or equal to qubits offered by the first quantum processing unit.

Embodiment 3. The method of embodiment 1 and/or 2, further comprising distributing a second portion of the second quantum job to a third quantum processing unit, wherein the third quantum processing unit executes the second quantum job.

Embodiment 4. The method of embodiment 1, 2, and/or 3, further comprising reducing user wait time by coordinating a split of the second quantum job into the first portion and the second portion.

Embodiment 5. The method of embodiment of 1, 2, 3 and/or 4, further comprising reducing wait time associated with performing the second job.

Embodiment 6. The method of embodiment of 1, 2, 3, 4, and/or 5, further comprising searching the second job queue for the second quantum job using a greedy search or a heuristic search.

Embodiment 7. The method of embodiment of 1, 2, 3, 4, 5, and/or 6, further comprising evaluating the second job queue using a queue exchange.

Embodiment 8. The method of embodiment of 1, 2, 3, 4, 5, 6, and/or 7, wherein the queue exchange comprises the second quantum processing unit publishing descriptions of quantum jobs in the second job queue or the second quantum unit providing an API that allows the descriptions to be queried.

Embodiment 9. The method of embodiment of 1, 2, 3, 4, 5, 6, 7, and/or 8, further comprising combining multiple circuits in the first and second quantum jobs to fit a qubit space of the first quantum processing unit.

Embodiment 10. The method of embodiment of 1, 2, 3, 4, 5, 6, 7, 8, and/or 9, further comprising selecting the second quantum job based on overall value to owners of the first and second quantum processing units and to owners of the first and second quantum processing jobs.

Embodiment 11. A method for performing any of the operations, methods, or processes, or any portion of any of these, or any combination thereof, disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
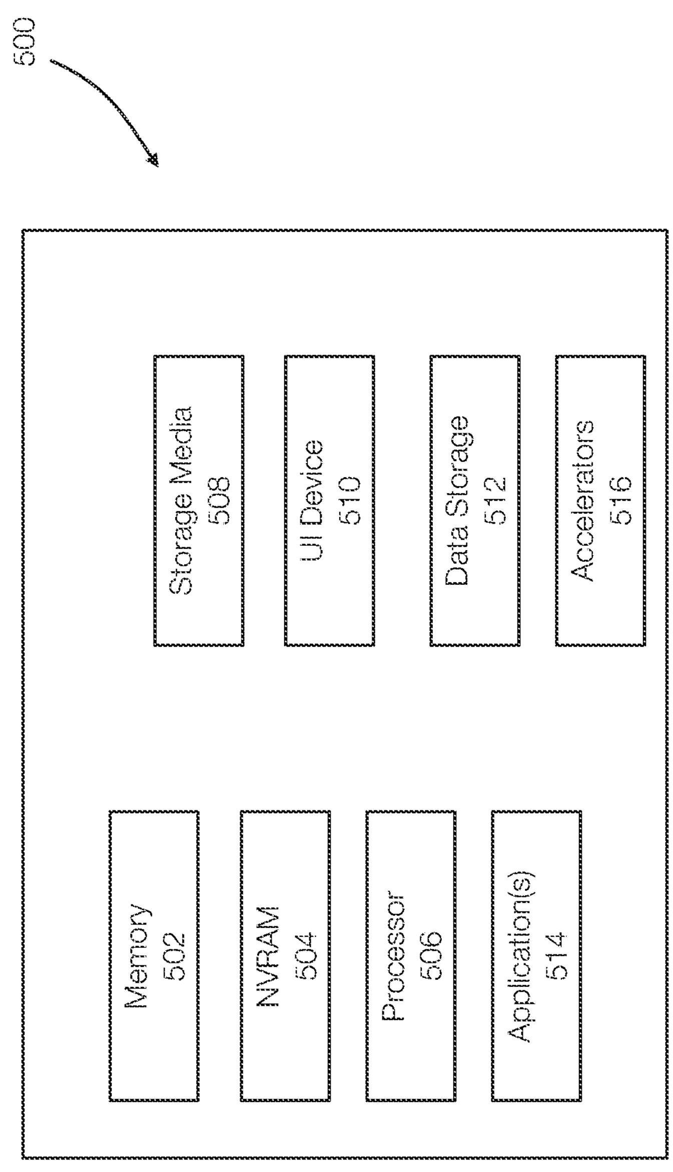
FIG. 5 discloses aspects of a computing device, system, or entity that includes computing components and/or quantum components.

With reference briefly now to FIG. 5, any one or more of the entities disclosed, or implied, by Figures and/or elsewhere herein, may take the form of, or include, or be implemented on, or hosted by, a physical computing device, one example of which is denoted at 5. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid-state device (SSD) storage. As well, one or more applications 514 may be provided that comprise instructions executable by one or more hardware processors 506 to perform any of the operations, or portions thereof, disclosed herein. The computing device 500 may include, be associated with, or have access to accelerators 616 such as quantum processing units and virtual quantum processing units (quantum processing units emulated in a CPU environment).

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

determining a utilization status of a first quantum processing unit when preparing to execute a quantum circuit included in a first quantum job retrieved from a first job queue associated with the first quantum processing unit;

evaluating a second job queue of a second quantum processing unit to determine if the job queue contains a second quantum job that can be executed concurrently with or separately from the first quantum job based on metadata describing a number of qubits required and entanglement characteristics of the second quantum job;

retrieving at least a portion of the second quantum job from the second job queue into the first job queue when unused qubits are available on the first quantum processing unit and the at least a portion of the second quantum job is compatible for concurrent execution based on qubit usage and when the qubits required by the first quantum job and the at least portion of the second quantum job are not entangled with each other; and performing the first quantum job and at least the portion of the second quantum job in the first quantum processing unit, the first quantum job and the at least portion of the second quantum job being executed (i) in parallel when the qubit partitions of the first quantum job and the at least portion of the second quantum job are non-entangled and fit within unused qubits, or (ii) sequentially when parallel execution cannot be performed due to qubit availability or entanglement constraints.

2. The method of claim 1, further comprising evaluating a number of qubits required by the second quantum job and determining whether total qubits used by the first quantum job and the second quantum job are less than or equal to qubits offered by the first quantum processing unit.

3. The method of claim 1, further comprising distributing a second portion of the second quantum job to a third quantum processing unit, wherein the third quantum processing unit executes the second quantum job.

4. The method of claim 3, further comprising reducing user wait time by coordinating a split of the second quantum job into the first portion and the second portion.

5. The method of claim 1, further comprising reducing wait time associated with performing the second quantum job.

6. The method of claim 1, further comprising searching the second job queue for the second quantum job using a greedy search or a heuristic search.

7. The method of claim 1, further comprising evaluating the second job queue using a queue exchange.

8. The method of claim 7, wherein the queue exchange comprises the second quantum processing unit publishing descriptions of quantum jobs in the second job queue or the second quantum processing unit providing an API that allows the descriptions to be queried.

9. The method of claim 1, further comprising combining multiple circuits in the first and second quantum jobs to fit a qubit space of the first quantum processing unit.

10. The method of claim 1, further comprising selecting the second quantum job based on overall value to owners of the first and second quantum processing units and to owners of the first and second quantum processing jobs.

11. A non-transitory storage medium having stored therein instructions that are executable by one or more hardware processors to perform operations comprising:

determining a utilization status of a first quantum processing unit when preparing to execute a quantum circuit included in a first quantum job retrieved from a first job queue associated with the first quantum processing unit;

evaluating a second job queue of a second quantum processing unit to determine if the job queue contains a second quantum job that can be executed concurrently with or separately from the first quantum job based on metadata describing a number of qubits required and entanglement characteristics of the second quantum job;

retrieving at least a portion of the second quantum job from the second job queue into the first job queue when unused qubits are available on the first quantum processing unit and the at least a portion of the second quantum job is compatible for concurrent execution based on qubit usage and when the qubits required by the first quantum job and the at least portion of the second quantum job are not entangled with each other; and performing the first quantum job and the at least a portion of the second quantum job in the first quantum processing unit, the first quantum job and the at least portion of the second quantum job being executed (i) in parallel when the qubit partitions of the first quantum job and the at least portion of the second quantum job are non-entangled and fit within unused qubits, or (ii) sequentially when parallel execution cannot be performed due to qubit availability or entanglement constraints.

12. The non-transitory storage medium of claim 11, further comprising evaluating a number of qubits required by the second quantum job and determining whether total qubits used by the first quantum job and the second quantum job are less than or equal to qubits offered by the first quantum processing unit.

13. The non-transitory storage medium of claim 11, further comprising distributing a second portion of the second quantum job to a third quantum processing unit, wherein the third quantum processing unit executes the second quantum job.

14. The non-transitory storage medium of claim 13, further comprising reducing user wait time by coordinating a split of the second quantum job into the first portion and the second portion.

15. The non-transitory storage medium of claim 11, further comprising reducing wait time associated with performing the second quantum job.

16. The non-transitory storage medium of claim 11, further comprising searching the second job queue for the second quantum job using a greedy search or a heuristic search.

17. The non-transitory storage medium of claim 11, further comprising evaluating the second job queue using a queue exchange.

18. The non-transitory storage medium of claim 17, wherein the queue exchange comprises the second quantum processing unit publishing descriptions of quantum jobs in the second job queue or the second quantum processing unit providing an API that allows the descriptions to be queried.

19. The non-transitory storage medium of claim 11, further comprising combining multiple circuits in the first and second quantum jobs to fit a qubit space of the first quantum processing unit.

20. The non-transitory storage medium of claim 11, further comprising selecting the second quantum job based on overall value to owners of the first and second quantum processing units and to owners of the first and second quantum processing jobs.

* * * * *